United States Patent [19]

Crosley

[11] 3,812,337

[45] May 21, 1974

[54] SEQUENTIAL CONTROL CIRCUIT HAVING IMPROVED FAULT DETECTION AND DIAGNOSTIC CAPABILITIES

[75] Inventor: Thomas Whitley Crosley, Northlake, Ill.

[73] Assignee: GTE Automatic Electric Laboratories Incorporated, Northlake, Ill.

[22] Filed: Apr. 6, 1973

[21] Appl. No.: 348,806

[52] U.S. Cl.. 235/153 AC, 235/92 EC, 235/92 GD, 340/146.1 AB

[51] Int. Cl. ........................ H03k 21/34, G06m 3/12

[58] Field of Search .......... 179/175.2 R; 235/153 A, 235/153 AC, 153 AK, 153 AP, 92 GD, 92 MC, 92 EC; 340/146.1 AB

[56] References Cited

UNITED STATES PATENTS

| | | | |
|---|---|---|---|
| 3,610,842 | 10/1971 | Formenti et al. | 179/175.2 R |
| 3,530,284 | 9/1970 | Wood | 235/153 AP |

OTHER PUBLICATIONS

Douglas, G. L., Walking Counter Synchronization Scheme, In IBM Tech. Disc. Bull. (15)6: pp. 1,848–1,849, Nov. 1972.

*Primary Examiner*—Malcolm A. Morrison
*Assistant Examiner*—R. Stephen Dildine, Jr.
*Attorney, Agent, or Firm*—Bernard E. Franz

[57] ABSTRACT

This invention relates to the architecture, fault detection and diagnostic capabilities of a sequential control circuit, or sequencer. The sequential control circuit can be instructed to test any of a number of circuits by executing one of several fixed sequences. The advance from one state to the next in the sequence is dependent on a combination of external signals from the circuit under test, the present sequence state, and the test mode. The new sequence state, in combination with the test mode, cause various actions to take place to further exercise the unit under test.

25 Claims, 11 Drawing Figures

SEQUENTIAL CONTROL CIRCUIT HAVING IMPROVED FAULT DETECTION AND DIAGNOSTIC CAPABILITIES

This invention relates to a sequential control circuit and, in particular, to its architecture, fault detection, and diagnostic capabilities.

CROSS-REFERENCES TO RELATED APPLICATIONS

The preferred embodiment of the invention is incorporated in a PROCESSOR CONTROLLED COMMUNICATION SWITCHING SYSTEM, U.S. patent application Ser. No. 130,133, filed Apr. 1, 1971, by K. E. Prescher, R. E. Schauer and F. B. Sikorski, now abandoned, and a continuation-in-part thereof Ser. No. 342,323, filed Mar. 19, 1973, hereinafter referred to as the SYSTEM application. The system may also be referred to as No. 1 EAX or simply EAX.

The memory access, and the priority and interrupt circuits for the register-sender subsystem are covered by U.S. patent application Ser. No. 139,380, filed May 3, 1971, by C. K. Buedel for a MEMORY ACCESS APPARATUS PROVIDING CYCLIC SEQUENTIAL ACCESS BY A REGISTER SUBSYSTEM AND RANDOM ACCESS BY A MAIN PROCESSOR IN A COMMUNICATION SWITCHING SYSTEM, hereinafter referred to as the REGISTER-SENDER MEMORY CONTROL patent application. The register-sender subsystem is described in U.S. patent application Ser. No. 201,851, filed Nov. 24, 1971, by S. E. Puccini for DATA PROCESSOR WITH CYCLIC SEQUENTIAL ACCESS TO MULTIPLEXED LOGIC AND MEMORY, hereinafter referred to as the REGISTER-SENDER patent application. Maintenance hardware features of the register-sender are described in four U.S. patent applications having the same disclosure filed July 12, 1972, Ser. No. 270,909, J. P. Caputo and F. A. Weber for a DATA HANDLING SYSTEM ERROR AND FAULT DETECTING AND DISCRIMINATING MAINTENANCE ARRANGEMENT, Ser. No. 270,910. by C. K. Buedel and J. P. Caputo for a DATA HANDLING SYSTEM MAINTENACE ARRANGEMENT FOR PROCESSING SYSTEM TROUBLE CONDITIONS, Ser. No. 270,912, by C. K. Buedel and J. P. Caputo for a DATA HANDLING SYSTEM MAINTENANCE ARRANGEMENT FOR PROCESSING SYSTEM FAULT CONDITIONS, and Ser. No. 270,916, by J. P. Caputo and G. O'Toole for a DATA HANDLING SYSTEM MAINTENANCE ARRANGEMENT FOR CHECKING SIGNALS, these four applications being referred to hereinafter as the REGISTER-SENDER MAINTENANCE patent applications.

The marker for the system is disclosed in U.S. Pat. No. 3,681,537, issued Aug. 1, 1972, by J. W. Eddy, H. G. Fitch, W. F. Mui and A. M. Valente for a MARKER FOR COMMUNICATION SWITCHING SYSTEM, and No. 3,678,208, issued July 18, 1972, by J. W. Eddy for a MARKER PATH FINDING ARRANGEMENT INCLUDING IMMEDIATE RING; and also in U.S. patent applications Ser. No. 281,586, filed Aug. 17, 1972, by J. W. Eddy for an INTERLOCK ARRANGEMENT FOR A COMMUNICATION SWITCHING SYSTEM, Ser. No. 311,606, filed Dec. 4, 1972, by J. W. Eddy and S. E. Puccini for a COMMUNICATION SYSTEM CONTROL TRANSFER ARRANGEMENT, Ser. No. 303,157, filed Nov. 2, 1972, by J. W. Eddy and S. E. Puccini for a COMMUNICATION SWITCHING SYSTEM INTERLOCK ARRANGEMENT, hereinafter referred to as the MARKER patents and applications.

The communication register and the marker transceivers are described in U.S. patent application Ser. No. 320,412, filed Jan. 2, 1973, by J. J. Vrba and C. K. Buedel for a COMMUNICATION SWITCHING SYSTEM TRANSCEIVER ARRANGEMENT FOR SERIAL TRANSMISSION, hereinafter referred to as the COMMUNICATIONS REGISTER patent application.

The above system, register-sender, marker and communication register patents and applications are incorporated herein and made a part hereof as t hrough fully set forth.

INTRODUCTION

As indicated above, this invention relates to the architecture, fault detection and diagnostic capabilities of a sequential control circuit, or sequencer as it is hereinafter alternately and commonly referred to, which is the heart of the Automatic Test System (ATS) of the above-mentioned No. 1 EAX. The ATS is used to test various space divided circuits in the EAX, such as lines, trunks, junctors, senders and receivers. The sequential control circuit of the ATS can be instructed by the system's central processing unit (CPU) to test any of a number of circuits by executing one of several fixed sequences. The advance from one state to the next in the sequence is dependent on a combination of external signals from the circuit under test, the present sequence state, and the test mode. The new sequence state, in combination with the test mode, cause various actions to take place to further exercise the unit under test (which had been accessed through special test inlets and outlets of the EAX network). A large amount of the circuitry is used by more than one test mode.

BACKGROUND AND SUMMARY OF THE INVENTION

There has been much work one on the subject of reliability through redundancy. A common technique, used in the electronic subsystems of the No. 1 EAX common control, is to duplicate entire functional units, (that is, markers, register-sender, computer) where a fault would halt or severely inhibit call processing. Two techniques have been employed. One is to run two duplicated units in synchronism, matching their outputs, resulting in instantaneous fault detection. The second technique, used in the markers, is to run duplicated units either alternately (TM's) of simultaneously but not in synchronism (OM's). In either case one unit can handle the entire load. Fault detection is based on the use of timers (functional and special) and test calls to a test network.

In the design of the subject sequencer for the ATS, it was not practical to adopt either of these approaches. Complete duplication with matching was economically unjustifiable as to the ATS is not critical to call processing. Use of external test circuits (analogous to the marker's test matrix) was not feasible due to the number of circuits tested by the ATS (ten main test modes). Therefore, a different scheme was designed for the ATS sequencer, one which is based on the Walking Gray Code (WCG). This code has the property of yielding 2N states with N flip-flops. The sequence state counter used as an example in the illustrated embodiment has sixteen flip-flops (32 states), however, the design is not limited to this number. The functional board designed for the sequence state counter is entirely modular, permitting any number of states in multiples of 8.

A self-routining 1/N type decode checking circuit also is provided that not only monitors the output of the sequence state decodes, but is also used to detect faults in the advance logic. (Most advance logic circuits require an additional circuit, such as parity, for checking purposes and even this cannot catch all faults). A unique and rigidly structured advance logic architecture is used which allows all faults to be found, either hardware-detectable during the normal spaced-divided tests, or by special diagnostic routines. This architecture require the isolation into a separate level a section of the logic most vulnerable to faults, and it is only this section which is duplicated. This redundancy, with its hardware fault detection, eliminates the need for diagnostic routining in this area.

In particular, this unique architecture allows the simple detection of stuck 1's on the input of AND gates, which is difficult if not impossible to find in the usual ad hoc combination of AND and OR gates. An additional feature is the high degree of localization possible, due to the division of the decodes into two halves which allows the segregation of "good" and "bad" decodes in a fault situation. The resulting decode points to the particular section of logic involved, which would be difficult if not impossible in the typical binary counter advance logic with its diverging nature of inputs.

Accordingly, it is the primary object of the present invention to provide an improved sequential control circuit and, in particular, such a circuit having improved fault detection and diagnostic capabilities.

A further object is to provide an improved sequential control circuit having at least one or more of the features set forth below.

In particular, one feature of the sequential control circuit or sequencer is that a serial 1/N-type check on decode of the sequence state counter is used, and is continually checked during the sequencer's passive cycle. It is also used for detection of faults in inputs to the sequence state counter, so that no separate circuits are required for these functions.

Another feature is the separation of the Walking Gray Code (WGC) to decimal decode into two halves (up/down) which permits segregation of good and bad decodes in a fault situation to yield one decode useful in formulating a trouble number to aid in localization of the fault.

A feature of the advance logic is that its overall architecture, being limited to only *m*-input AND gates, in which all inputs are accessible via buses, permits fault conditions (particularly stuck 1's on AND gates) to be located.

In conjunction with, and to permit the above feature, part of the advance logic function is segregated into another level, called the A/B compare logic, which is made up of AND gates with a variable number of inputs. Therefore, redundancy is provided which checks for both stuck 0's and 1's via a False Advance alarm, so that no diagnostic routine is required.

Still another feature relates to the concept of the use of active and passive cycles in sequence control which allows only one set of distributing pulses to be generated per sequence state advance, and permits continuous routining by hardware of the 1/N-type decode check during the passive cycle, even during consecutive sequence state advances.

A further feature relates to the separation of the "regular" and "test advance" inputs to the sequence state counter, therey allowing isolation of the sequence state counter from the external advance logic so that it can be checked first by itself, prior to being used as a diagnostic register for rountining of the advance logic.

Another feature is the use of feedback to check SSII outputs of the sequence state decoder, which outputs are not fully checked by the 1/N circuit since two sets of outputs are required for loading purposes.

The invention accordingly comprises the several steps and the relation of one or more of such steps with respect to each of the others and the apparatus embodying features of construction, combination of elements and arrangement of parts which are adapted to effect such steps, all as exemplified in the following detailed disclosure, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings, in which.

Similar reference characters refer to similar parts throughout the several views of the drawings.

BLOCK DIAGRAM OF SEQUENCER (FIG. 1)

Figure 1:
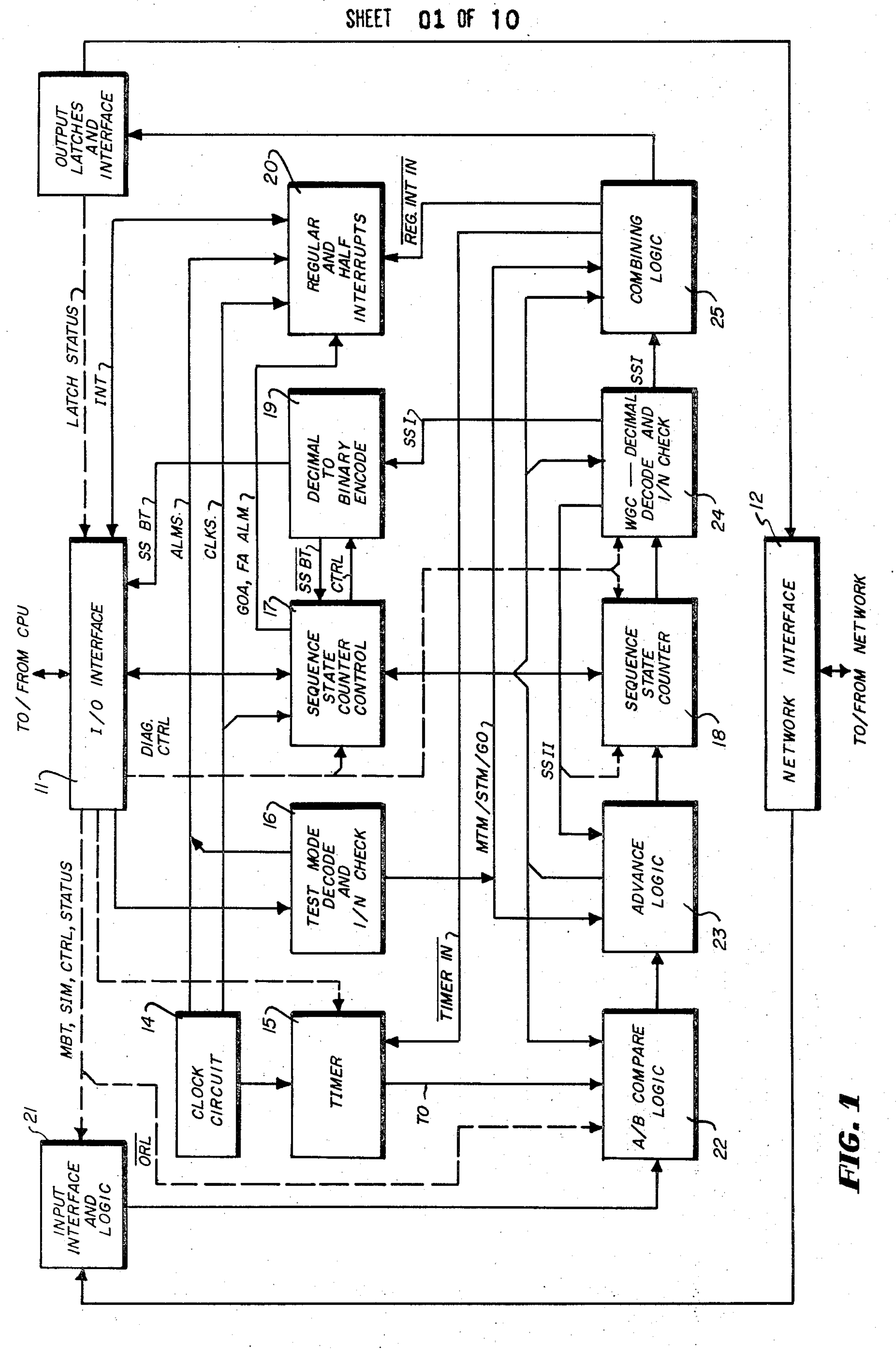
FIG. 1 is a block diagram schematic of the sequential control circuit.
Figure 2:
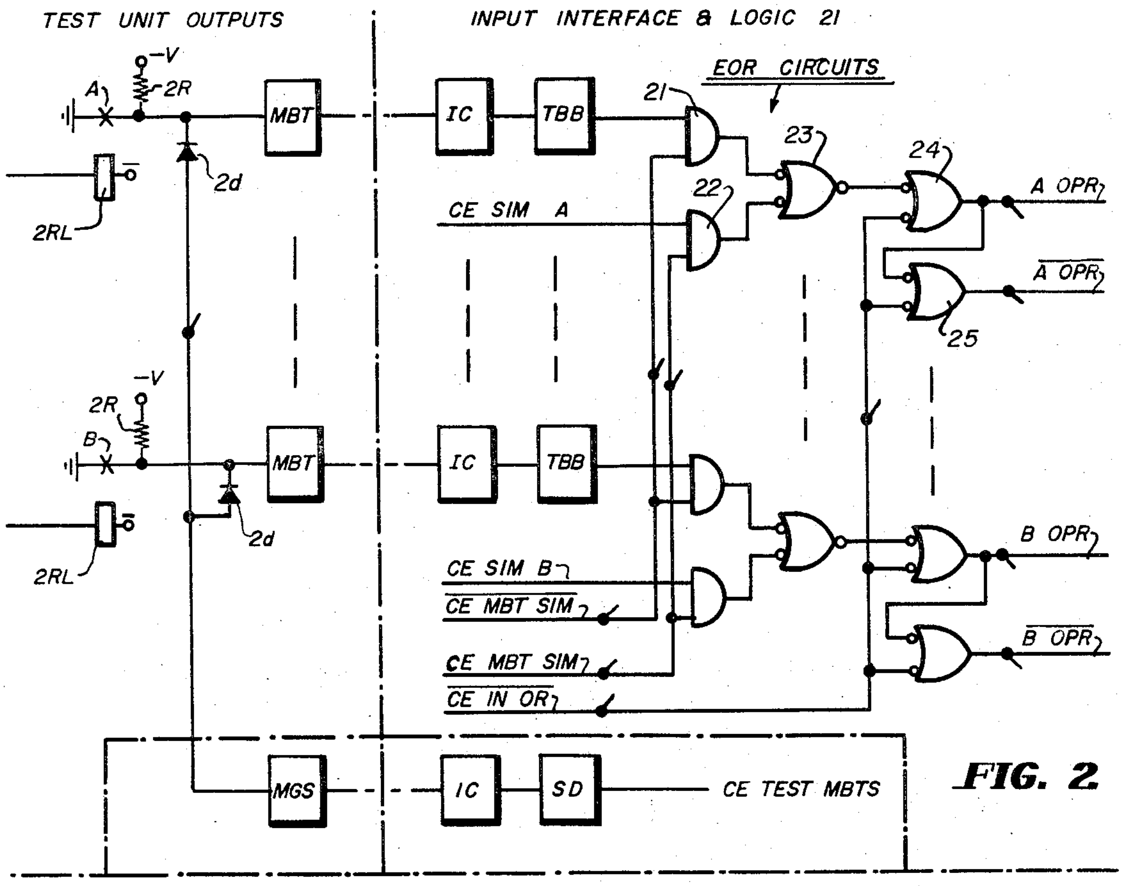
FIG. 2 is a block diagram schematic of the input interface and logic, with two typical circuits being illustrated.

FIG. 1 is a block diagram of the sequencer of the invention, and it can be seen that it has two interfaces: and I/O interface 11 to and from the central processor unit or CPU, and a network interface 12 to and from the system or network. The sequencer receives instructions from the CPU regarding the type of test to be run, and sequentially performs the desired test. The results of the test may be sent back to the CPU both during and at the completion of the test. To provide for this communication, the I/O interface 11 is provided and, for the purpose of describing and understanding the invention, it can be thought of as two buffers, one for input and one for output, with appropriate control to enable the information to be passed to and from the CPU. Besides being used for the control of the various tests, the I/O interface 11 can also be used for diagnostic routining of the sequencer. In addition to the regular fields, special fields of the input and output buffers are dedicated for diagnostics.

In addition, an interrupt capability exists for the sequencer to request the attention of the CPU. This capability is used both for the regular tests (to indicate the CPU should retrieve a set of test results) or indicate a hardware-detected fault in the sequencer (which causes a "malfunction" interrupt).

The network interface 12 is to and from the network, and consists of electromechanical test circuits. Under control of the sequencer, the electromechanical test circuits are used to test the space divided circuit which has been selected.

The clock circuit 14 is comprised of four clocks CLKS. A, B, C and D which are each 8 microseconds long. In addition to these outputs, additional clocks are generated by the clock cirucit: CLK. A [TRAIL], CLK, B [TRAIL], CLK. C [TRAIL] and CLK. D [TRAIL], which are the last 4 microseconds of CLKS. A–D respectively; CLK. F, which is the first 2 microseconds of each CLK. A–D; and CLK. S, which is the first 2 microseconds of CLK. A only.

To perform various timing, outpulsing and scanning functions, the three routiners in use in the No. 1 EAX (MRL, MLS, MTS) all have a circuit dubbed the hardware timer/scanner. This circuit however, is somewhat complex, and an understanding of it is not necessary to understand the present material. Accordingly, for the purpose of describing the invention, a timer 15 which can be used for timing specific intervals required by the various tests is illustrated. The timer is basically a presettable backwards-counting binary ripple counter. A timing interval is selected by a momentary logic 0 on one of the several $\overline{\text{TIMER IN}}$ inputs. A fixed time afterwards, lead TO (timeout) goes to a logic 1 and stays high until the next preset. The timer 15 can be routined independently via the I/O interface 11.

The test mode decode and 1/N check circuit 16 decodes the MTM (Main Test mode) into one of N lines. It also buffers and controls the STM (Sub Test Mode), and GOX (Go bit) fields of the output buffer. The test mode (MTM and STM) and Go bits are used to select and control the appropriate testing logic in both the advance and combining logic stages 23 and 25, respectively. Special MTM's allow all MTM and/or all STM/GO lines to be high simultaneously for diagnostic routining of the advance logic 23. A 1/N check is provided on the outputs of the test mode decode 16.

The sequence state counter control 17, which is more fully described below, controls the timing of the active (advance) and passive cycles of the sequence state counter 18. It also enables the A/B compare logic 22, and monitors the synchronous alarms from the counter 18.

The decimal to binary encode 19 converts the decimal sequence state value (0–31 in the illustrated embodiment) to binary (5 bits) for transferring to the CPU. The output of the encode 19 is checked by a BIN alarm, in a manner described more fully below.

Figure 10A:
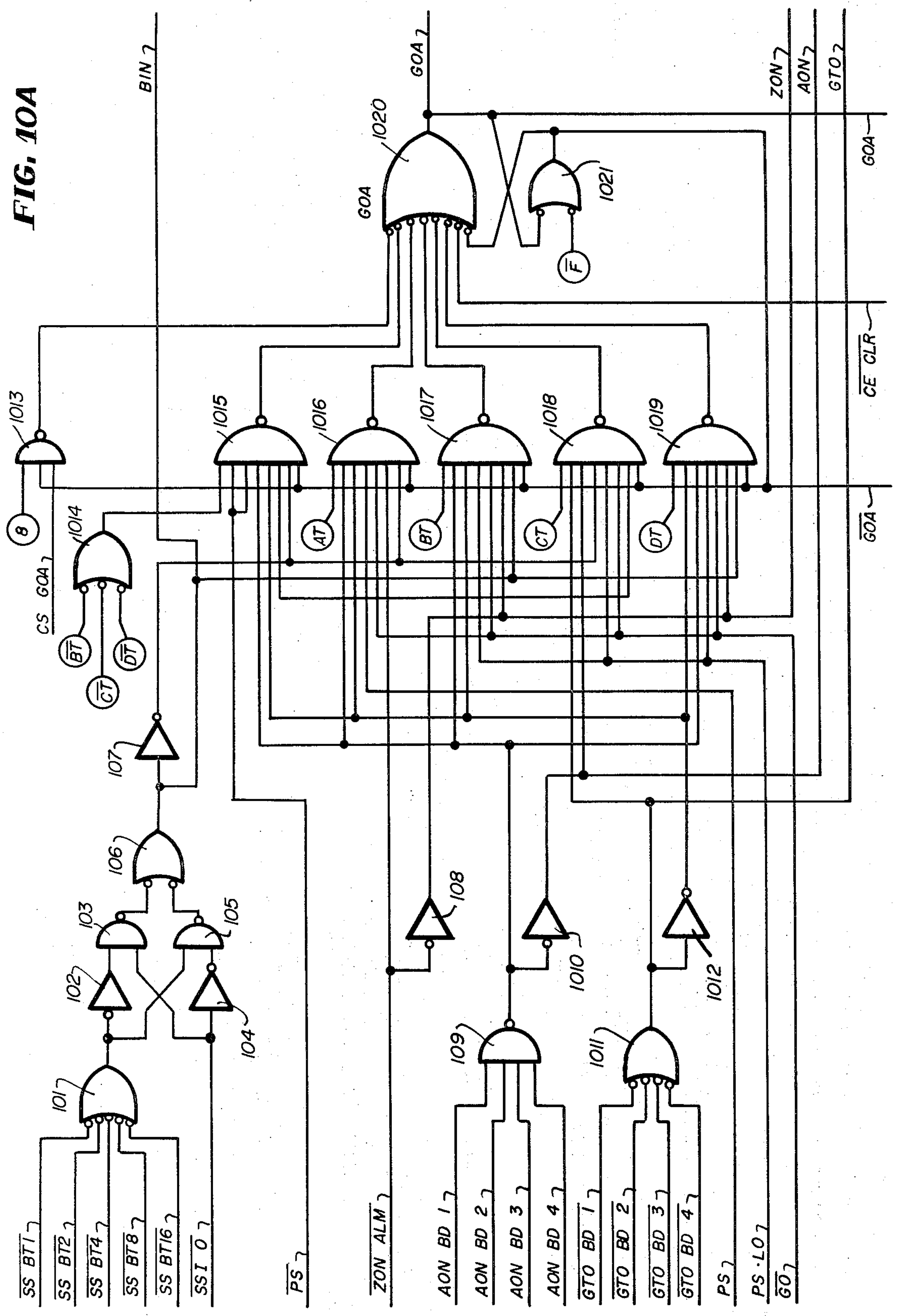
Figure 10B:
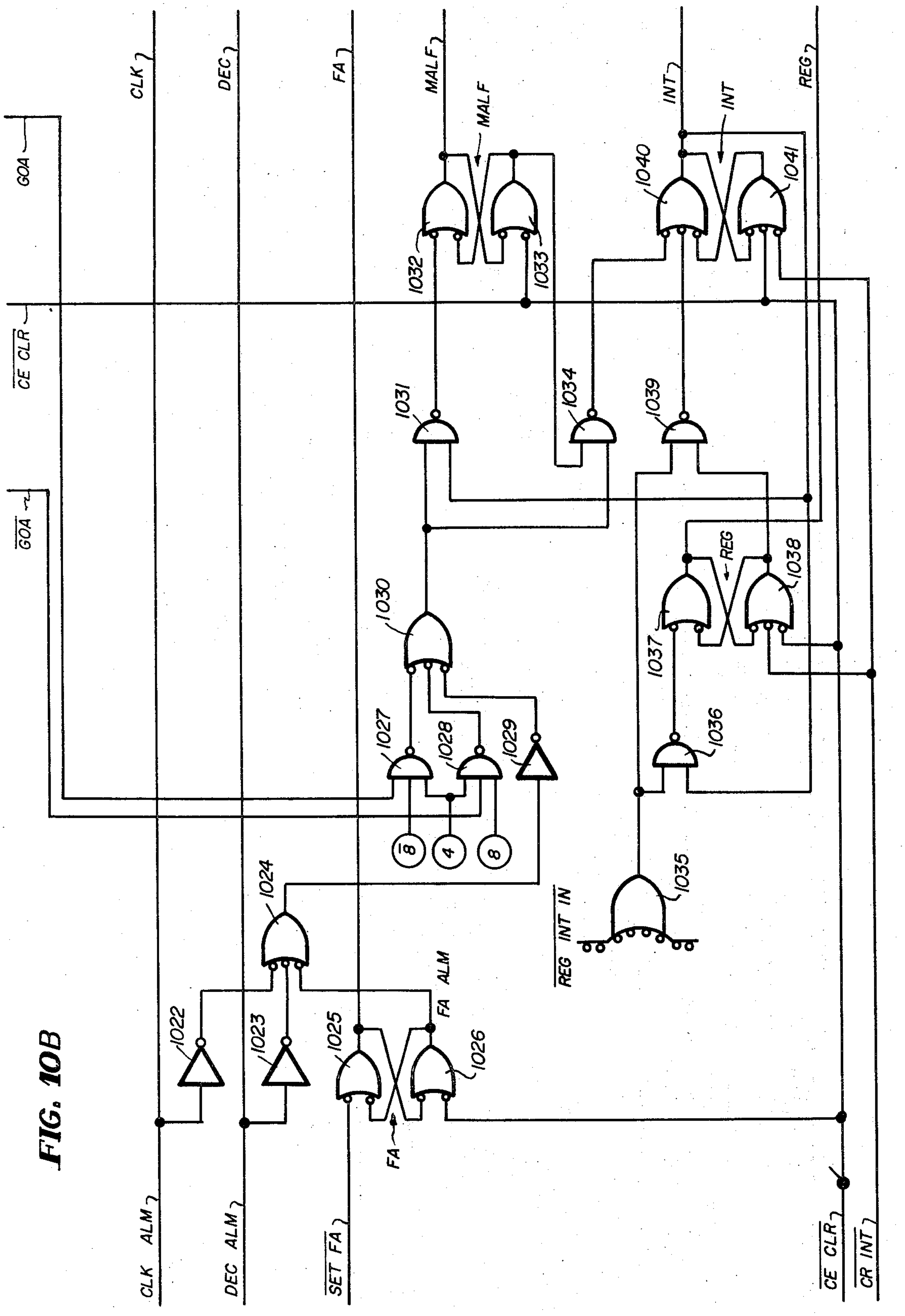

An interrupt circuit 20 is provided and, as previously mentioned, two kinds of interrupt are provided for: regular and malfunction. As shown in FIG. 10, a momentary 0 or any $\overline{\text{REG INT IN}}$ lead will cause both the latches INT and REG to set. The INT lead interrupts the CPU, while REG indicates the interrupt type. Both latches INT and REG are reset via $\overline{\text{CR INT}}$ at the same time the computer retrieves the data. Setting of the latch MALF will be covered later.

The remaining subsystems 21–25 are described in detail below, in conjunction with FIGS. 2–7. In these figures, leads under control from the computer (via the I/O interface 11) which are typically used to control diagnostics begin with the abbreviations: CE (CPU Enable), CD (CPU Disable), CS (CPU Set), and CR (CPU Reset). The various AND gates, OR gates, etc. are indicated by a reference numeral which indicates the figure in which it appears and then the number referencing the particular gate, that is, AND gate 625 is shown in FIG. 6.

INPUT INTERFACE AND LOGIC 21 (FIG. 2)

There are any number of MBT's (Main Battery Test) gates located in the electromechanical test unit or network interface 12, used to sense contact closures and/or presence of ground on output leads. They are connected 1:1 to TBB's (Test Buffer B) via standard interface chokes IC. Each MBT is normally held "on" through a 30.1K resistor 2R to –50 volts (associated TBB output is low). When the appropriate relay 2RL operates, and/or ground is placed on the MBT input, the MBT turns off (causing the output of the associated TBB to go high).

Each TBB is connected to an AND gate 21 comprising one side of an EOR circuit. The other side of the EOR circuit comprises an AND gate 22 which is controlled from the CPU. By enabling either one side or the other, either the actual or simulated inputs can be selected (the latter is used by diagnostic routines).

The selected output is buffered twice through OR gates 24 and 25, to obtain both the true and not true outputs of the signal, both of which can be forced to a logic one simultaneously by the CPU in diagnostic advance routines. Both outputs are used by the A/B compare logic 22 to form the desired logic equations for advancing sequence states. In addition the "not true" output of OR gates 25 is gated to the I/O interface as status information and for diagnostic routines.

One additional circuit is provided, which consists of an MGS (main Ground Switch) connected via diodes **2*d*** so as to be able to ground the inputs of each MBT simultaneously. The MGS is controlled, via a switch driver (SD) and choke IC, from the CPU during diagnostic routines to check the overall interface (electromechanical to electronic).

A/B COMPARE LOGIC 22 (FIG. 3)

Figure 4:
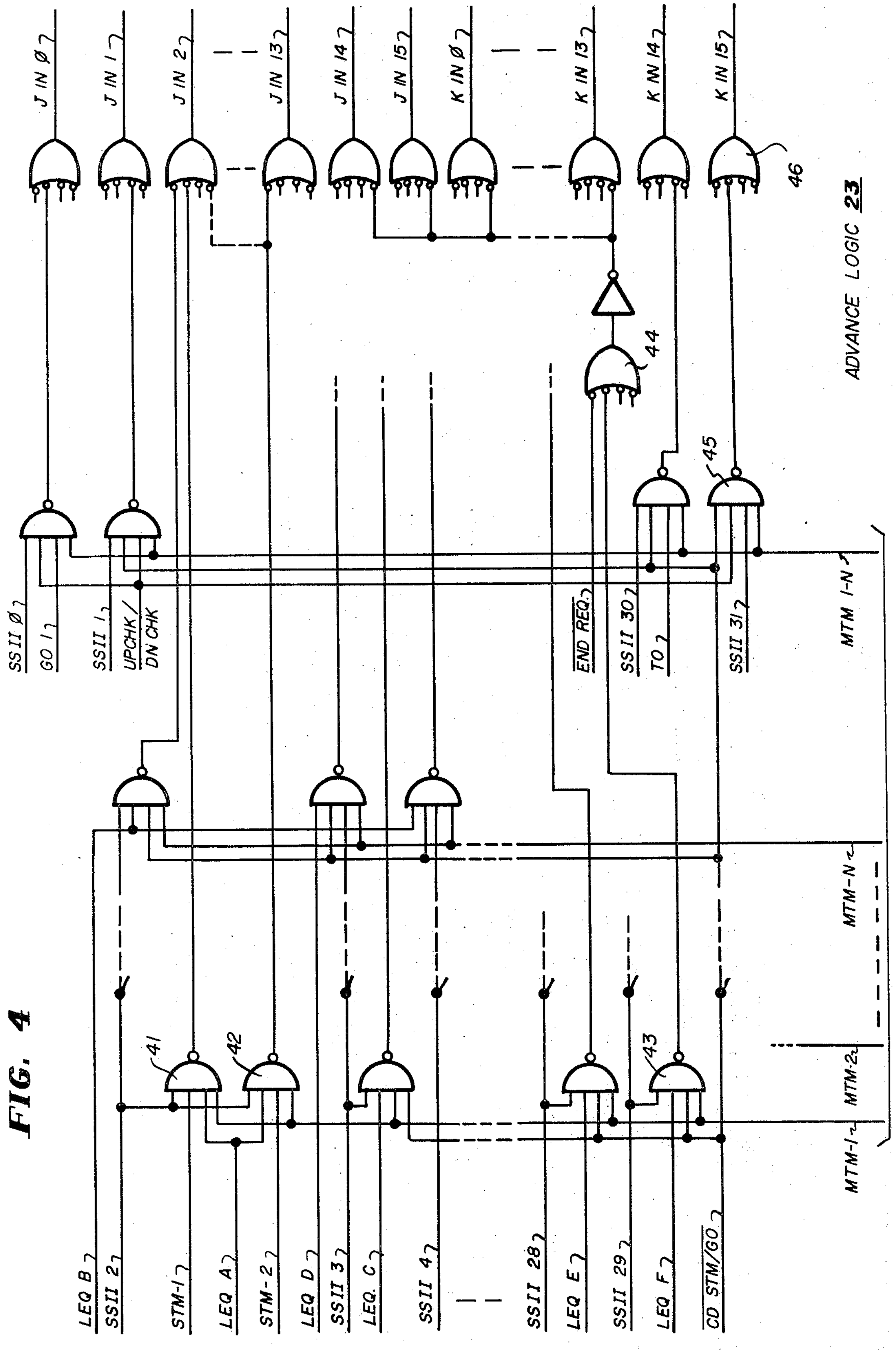
FIG. 4 is a block diagram schematic of the advance logic, the illustration being a typical portion thereof.

The conditions for a particular sequence state advance depend on a combiantaion of various test unit outputs and/or the timeout TO of the timer 15. It is necessary to "AND" together these conditions with the MTM, STM, current sequence state, and possibly a GO bit (instruction from the CPU to proceed after an interrupt). This is accomplished in two stages, the A/B compare, and the advance logic 23 (FIGS. 1 and 4). This division allows for the multiple use of A/B compare outputs for several sequence state advance equations (that is, the same combination of external signals may be used in more than one MTM or sequence state).

The A/B compare logic 22 AND's together the combination of input conditions (test unit outputs) necessary for various sequence state advances. This stage of logic is the most vulnerable to latent failures, as an open bond on an input lead (the most common failure mode) will result in a logic 1 to an AND gate, possibly causing a premature (and erroneous) advance to take place. The problem is compounded further, since it is not known if the input conditions are correct at all, since the circuit is being used to routine electromechanical circuits which may contain faults. Also, the AND gates do not all have the same number of inputs, making routining difficult (it would be necessary to do it on an individual gate basis).

For these reasons, a certain amount of fault detection in the hardware is required. This is accomplished by duplicating the AND gates, and ORing the outputs back together. One or the other of the AND gates is selected in sequence, and the output is checked to the same. This is different than the normal approach to redundant logic, in which the outputs are not recombined but continued on a redundant basis.

Figure 3:
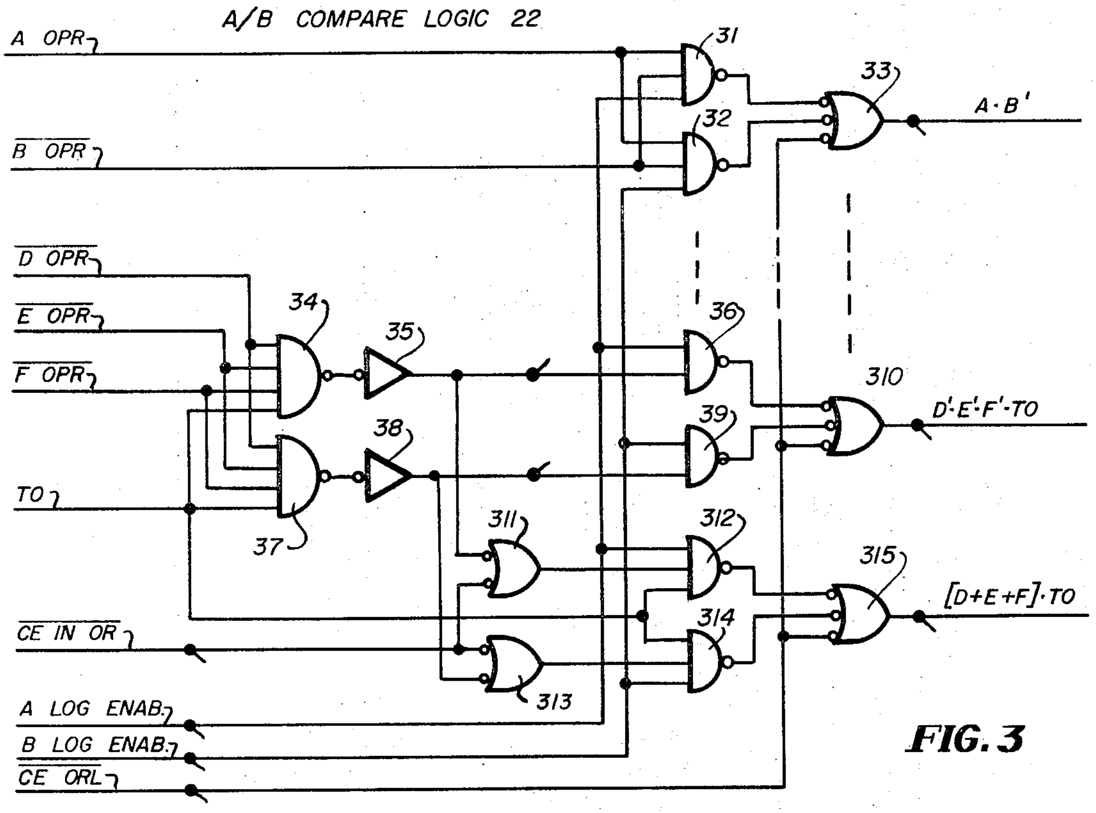
FIG. 3 is a block diagram schematic of the A/B compare logic, with two typical circuits being illustrated.

In FIG. 3, two examples of the A/B compare logic, one simple and one more complex, are illustrated. The AND gates 31 and 32 AND the same set of inputs together. The output of one of the two selected gates 31 and 32 is fed in OR gate 33, whose output is fed to one or more gates in the advance logic 23. (More than one sequence state advance may depend on the same combination of external input signals).

The second example is somewhat more complex, and represents a multiple use of the redundant AND gates. Two outputs are required, as provided by gates 310 and 315. One is the AND'ing of all the inputs, and the second basically an OR function. Use is made of the fact that a NAND gate can do both functions. The logic for the first output (formed by gates 34, 35, 37, 38, 36, 39 and 310) is straight-forward, however, note that the select lines (A LOG ENAB and B LOG ENAB) are AND'ed in at a second level. This allows the first two gates 34 and 37 to be used as OR's to form the second output, via the gates 34, 36, 35, 38, 311, 313, 312, 314, and 315.

The output of gates 34 and 37 will be a D+F+E+$\overline{\text{TO}}$. This is AND'ed by gates 312 and 314 with both the select lines and TO (timeout). A possible spike resulting from the product TO.$\overline{\text{TO}}$ is masked by the sequence control timing.

Part of the second circuit is also representative of a section of the UPCHK/DNCHK signal (not shown) which is the AND'ing of all the signals from the test units, and TO. This signal is used in the start and end sequences which is common to all the tests and checks that the interface is normal (all MBT's ungrounded). For this purpose, the outputs of gates 35 and 38 (D'.E'.F'.TO) are AND'ed with similar outputs in other sections of the A/B compare logic 22, and finally combined with the two select lines, to achieve the desire output.

As previously mentioned, both the true and not true outputs of each "X OPR" can be forced true by the CPU via $\overline{\text{CE IN OR}}$. This has the affect of making true all possible logic combinations in the A/B compare logic 22 except the outputs such as from gate 315. Therefore the same control lead is OR'ed into gates 311 and 313 to force the gate 315 true, via A LOG ENAB or B LOG ENAB.

In addition, a direct diagnostic control lead $\overline{\text{CE ORL}}$ into each of the output OR's (gates 33, 310, 315) can be used to force them true.

ADVANCE LOGIC 23 (FIG. 4)

The A/B compare logic outputs (denoted LEQ's, for logic equations) are AND'ed with the appropriate sequence state and test mode in the advance logic 23. In this illustrated embodiment, two sequence states at the begining (1 and 2) and two at the end (30 and 31) have been reserved as start and end sequences which are common to all test modes, thus they are AND'ed with "MTM1-N". However, no restriction is placed on the use of such common sequence states, or that they exist at all as far as the architecture of the advance logic goes. The control logic does assume sequence state 0, however, to be common to all test modes (idle state of sequencer).

The remaining AND gates in the advance logic roughly form a rectangular matrix which is N gates wide (number of MTM's) by 28 (total number of sequence states — 4 for the common). However, it is by no means a perfect matrix since (1) not all test modes use the same number of sequence states; (2) for some sequence states in some MTM's, multiple branches can take place based on an STM (that is, gates 41 and 42).

The output of each of the advance level AND gates is OR'ed as appropriate to enable the proper J or K input of the sequence state counter 18. Since a Walking Gray Code counter is being used, normally only one J or K input must be enabled to advance consecutive sequence states. However, sometimes jumps are made which must change several flip-flops (that is, gate 42 enables a jump from SS2 to SS14). To accommodate such groups, or simply additional inputs, this OR stage can be "built out" to several levels, as long as only OR's are used (no AND's). For example, gate 44 enables a group of inputs which will cause the sequence counter 18 to jump to SS30 (beginning of the common end sequence) from any other sequence state by forcing the counter flip-flops into the pattern 1100...00. This group has inputs from the regular advance logic 23, via the gate 43 and also from the CPU (request to jump into the end sequence), as explained more fully below.

It may be noted that in the advance logic 23, only 4 input AND's are used. This allows all the gates to be routined together, which was impossible in the A/B compare logic 22. Three of the inputs (MTM, SS and LEQ) are used for every sequence state advance. The fourth is only occasionally used for STM's or GO bits. Unused STM/GO inputs are therefore tied together and are under control of the CPU for diagnostic advance routines (via the MTM decode).

SEQUENCE STATE COUNTER 18 (FIG. 5)

Figure 5:
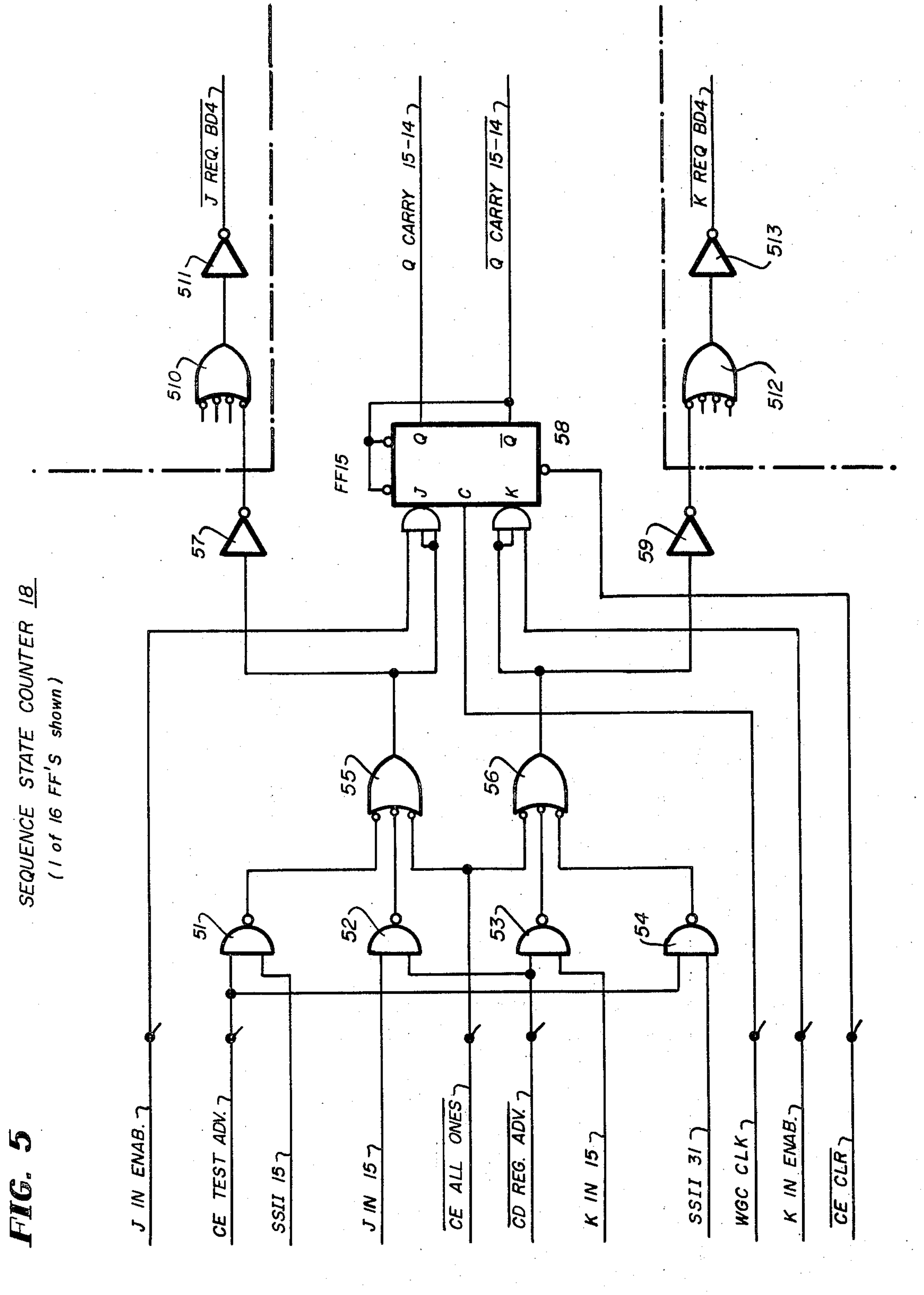
FIG. 5 is a block diagram schematic of the sequence state counter, with one of its 16 flip-flops being illustrated.
Figure 6:
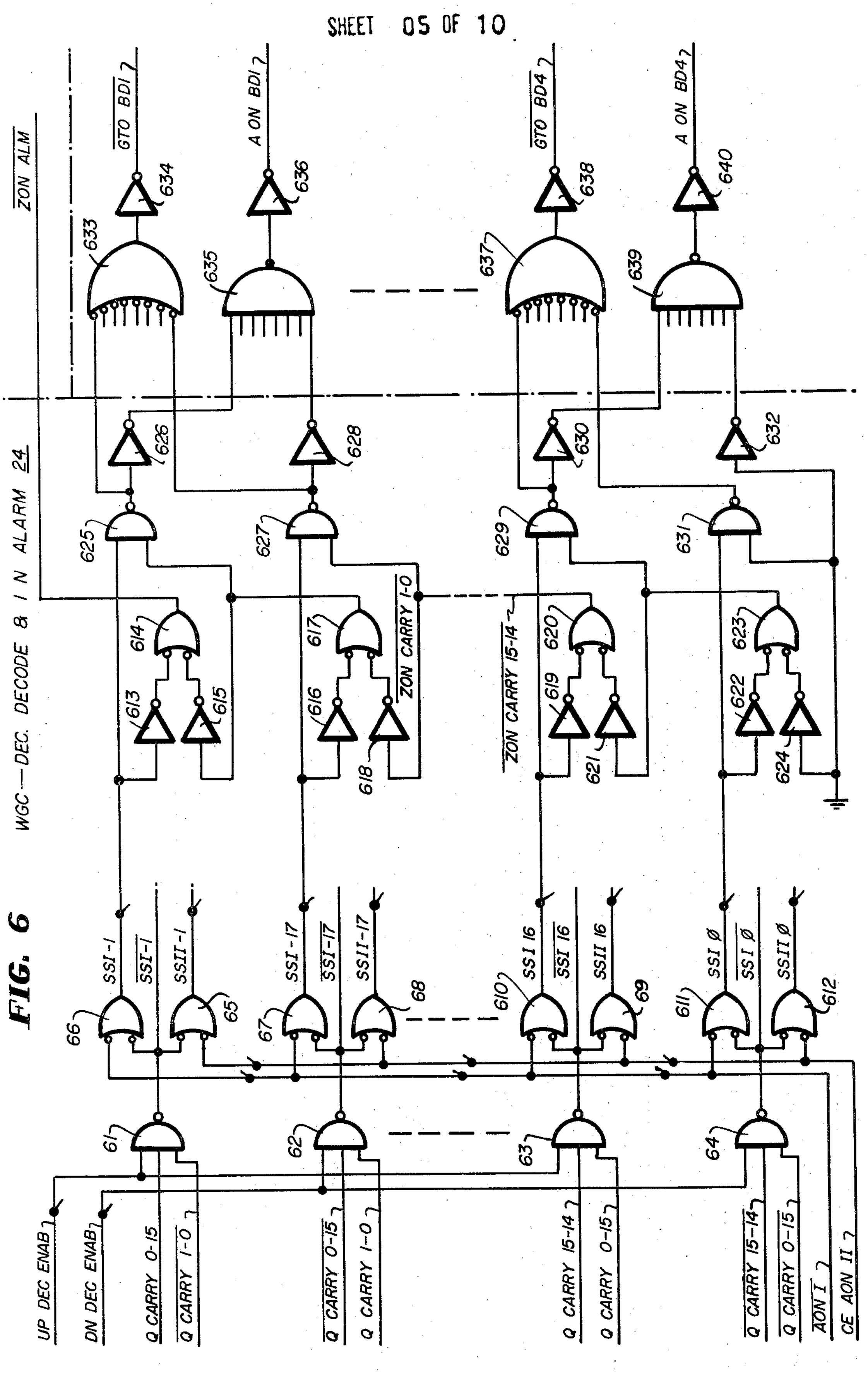
FIG. 6 is a block diagram schematic of the Walking Gray Code to decimal decode and 1/N alarm circuit, with four of its 16 circuits being illustrated.

In FIG. 5, one of the 15 flip-flops in the sequence state counter 18 is shown. The counter 18 has two sets of advance inputs. The first set, used for advancing sequence states via inputs from the advance logic 23, uses gates 52 and 53. The 16 J IN and 16 K IN lines are selected via $\overline{\text{CE REG ADV}}$ which is normally kept high. For a diagnostic routine, however, this lead is made low and CE TEST ADV is enabled from the CPU. This connects SSII outputs of the counter (via gates 51 and 54) around to the inputs so that it is independent of the advance logic.

An additional control lead, $\overline{\text{CE ALL ONES}}$, allows the CPU to jam ones into both the J and K inputs of all flip-flops in the counter 18 simultaneously.

Gates 55 and 56 OR together the three modes of input. If a signal is present at the output of either gate, it will cause a 0 on either $\overline{\text{J REQ BD 4}}$ or $\overline{\text{K REQ BD 4}}$ via gates 57, 510, and 511 or 59, 512, and 513, which starts the advance cycle in the sequence control, as explained more fully below. If the A/B compare stages agree, the J IN ENAB and K IN ENAB leads are made high, gating the input into the J and K inputs of the flip-flops. The WGC CLK is then pulsed, clocking the counter on the falling edge. The outputs of the flip-flops (Q CARRY...) feed into the WGC to decimal decode circuit 24.

WGC TO DECIMAL DECODE AND 1/N ALARM 24 (FIG. 6)

The output of the flip-flops of the sequence state counter 18, in Walking Gray Code, is converted to decimal by the WGC to decimal decode circuit 24. In this circuit, a counter using 16 flip-flops provides a total of 32 valid states. Thirty of the states are decoded by looking for adjacent 0's and 1's, or vice versa (gates 61 and 62, for example). The other two statew, 0 and 16, must be decoded by looking for either both 0s or both 1's at the "end flip-flops" of the counter (as illustrated, gates 63 and 64).

The inverted decoded output, $\overline{\text{SSI}}$, is fed to the decimal to binary encode circuit 19. The true sense of the decode is provided by two outputs, SSI and SSII. (Loading considerations dictated the requirement for multiple outputs). The SSI outputs are used by the combining logic 25, whereas the SSII outputs are used by the advance logic 23. The SSI outputs are thoroughly monitored by a serial 1/N circuit described below. Gates such as 65, 68, 59 and 612 (SSII outputs) are not checked directly, but are checked indirectly due to the feedback around to the advance logic 23 and to the test advance inputs to the sequence counter 18, as illustrated in FIG. 1.

The primary error detection scheme in the sequence state counter 18 and decode 24 is the serial 1/N circuit of the decode 24. A serial, rather than parallel circuit, is used since speed of operation is not critical and the serial circuit is less expensive. As explained more fully below, three separate outputs actually are provided: a ZON ALM (Zero of N) which goes to a logic 1 when all 32 SSI outputs are low; a GTO ALM (Greater than One) which goes to a logic 1 whenever more than one SSI output is high; and an AON CHK (All of N) which goes to a logic 1 whenever all 32 SSI outputs are high simultaneously.

As can be seen in FIG. 6, the output of the gate 614 ($\overline{\text{ZON ALM}}$) is derived from a serial chain that begins with decode 0 (gate 622) and is carried through all of the decodes to decode 1 (gate 613). The output of the first gate 624 is forced high by an "end" strap. Any decode going to a logic 1 causes that portion of the carry chain above that decode to go high. Therefore, if any decode is high, the output of gate 614 will be a 1 ($\overline{\text{ZON ALM}}$).

Across each of the uncomplemented inputs to the negated input OR gates is a NAND gate (gates 625, 627, 629, 631). If more than one decode comes up at the same time, the output of one or more of these gates will go low, causing a GTO alarm (that is, $\overline{\text{GTO BD1}}$) in the following manner. Assume one decode (SSI output) is already high. Therefore, the $\overline{\text{ZON CARRY}}$ chain "above" that decode is also high. If another decode above the first goes high, the NAND gate is enabled and its output goes low and is propagated through to cause a GTO alarm.

If instead the second decode appears "below" the first, the 1 on the $\overline{\text{ZON CARRY}}$ is shifted. Now the GTO alarm will come from the first decode. If all SSI outputs are enabled (via the $\overline{\text{AON I}}$ lead being low), then all GTO alarm AND gates (625, 627, etc.) will be enabled, the output of all the AON CHK inverters (626, 628, 630, 632) will be high, and these outputs are AND'ed together to yield the AON CHK signal (that is, AON BD4).

The above three alarms (ZON, GTO, and AON) are referred to as synchronous alarms since they are checked automatically by the sequence control synchronized with various clock signals. One additional synchronous alarm, BIN (binary), is driven off the decimal to binary encoder, as can be best seen in FIG. 10. If the sequence state counter 18 is in SS0, all $\overline{\text{SS BT}}$ leads (sequence state bit) should be high. $\overline{\text{SSI 0}}$ will be 0, therefore the output of gate 106 will be low. If the sequence state is not 0, at least one of the $\overline{\text{SS BT}}$ leads should be 0, however, gate 106 will still be off since $\overline{\text{SSI 0}}$ is high. If either of the above tests fail, the output of gate 106 will go high (BIN ALM); that is, some bit was true during SS 0, or no bits are true for some sequence state greater than zero.

COMBINING LOGIC 25 OUTPUT LATCHES AND INTERFACE 26 (FIG. 7)

Figure 7:
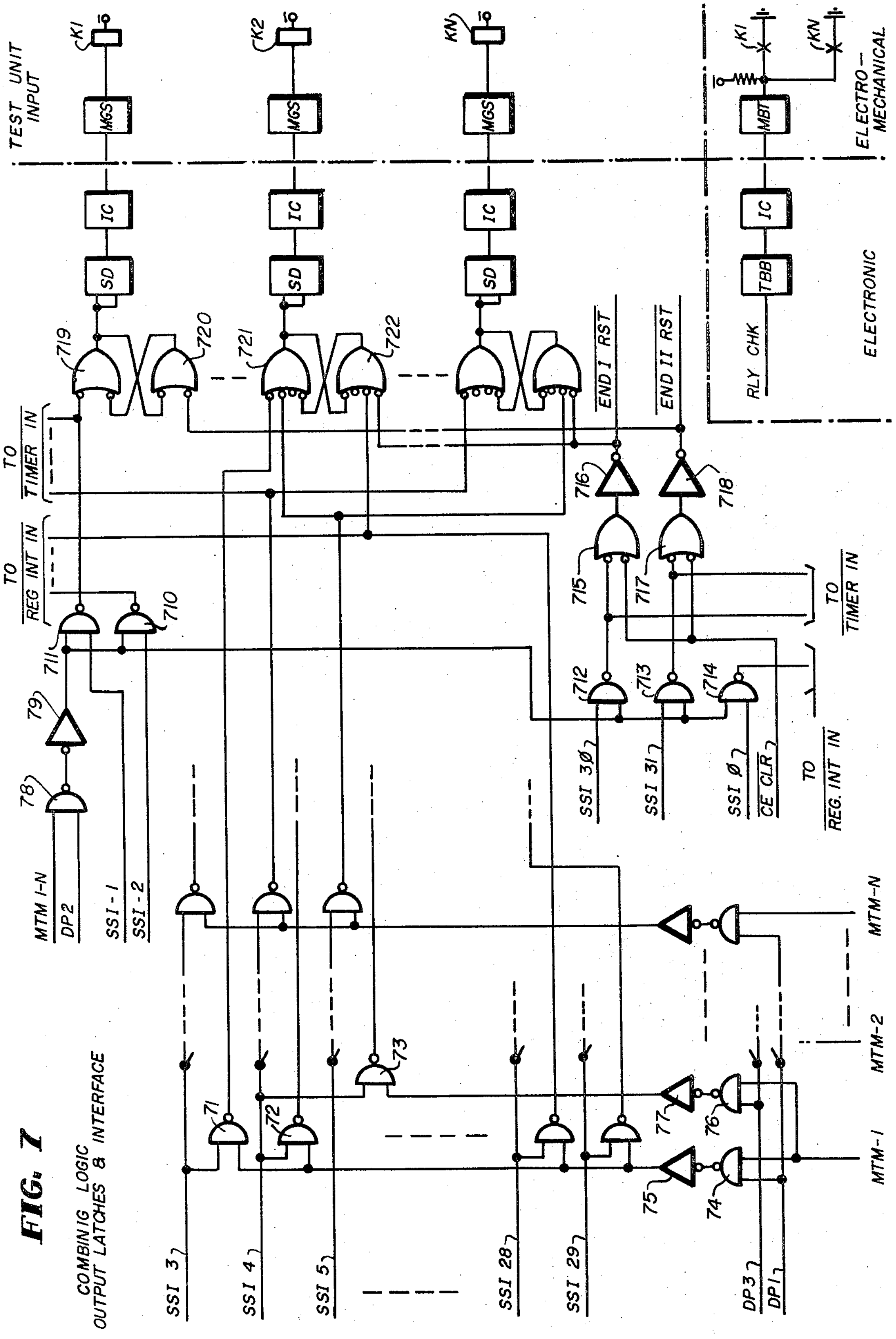
FIG. 7 is a block diagram schematic of the combining logic, output latches and interface, the illustration being a typical portion thereof.

After each sequence state advance, it is usually necessary to cause some action to take place which will initiate the exercising of some additional part of the space-divded equipment under test. The various relays required for this purpose are shown in FIG. 7 as K1–KN. Each is controlled via an MGS (Main Ground Switch) connected to a SD (Switch Driver) via an IC (Interface Choke). Each SD is connected to a latch, which can be set or reset during various sequence states. The use of latches, rather than straight combinatorial logic driven off the sequence state decode, allows this decode to be disabled during part of the clock cycle (for self checking of the 1/N alarm) while the test unit outputs remain held up by the latches. Use of latches also eliminates complex logic to hold some outputs during several sequence states, while holding another up only one, for example.

Pulses for setting and resetting the various latches are produced in the combining logic 25, which consists of NAND gates, in a rectangular array similar to the advance logic 23, where a sequence state is "combined" with the test mode. For example, in FIG. 7, the latch including gate 721 (enabling K2) can be set in SSI3 of MTM 1 via gates 71, 74, 75. Gate 74 is clocked with DP1, which is one of three Distributing Pulses generated during the "active cycle" which is part of each sequence state advance, as explained more fully below.

Similar to the advance logic, certain gates are part of a start and end sequence common to all test modes (that is, gates 78–718). The end sequence (gates 712–718) (SSI30 and 31) provide two reset pulses ($\overline{\text{END I RST}}$ and $\overline{\text{END II RST}}$) which reset all latches in the output logic. (Two are provided to allow a sequence of operations to avoid wet switching of contacts in the test unit). This end sequence, as mentioned before, can be initiated from the CPU no matter what the present sequence state is. An additional input, $\overline{\text{CE CLR}}$, is provided to reset all the latches in the sequencer, including those in the control logic, for power-up situations.

Note that in addition to setting and resetting of latches, combining logic output may be used to preset the timer 15 to request a timing interval ($\overline{\text{TIMER IN}}$), and set an interrupt ($\overline{\text{REG INT IN}}$).

One additional circuit should be mentioned: as part of the UPCHK/DNCHK, as described above, the signal RLY CHK is derived from OR'ing via relay contacts the status of all the relays in the test unit. (For MGS's used only for placing grounds on leads, diodes can be used instead.) The end result is a signal which will be low if all the output interface 26 is "normal"— unoperated. This signal is fed into the input interface 21 similar to any other MBT output and the inverted sense $\overline{\text{RLY CHK}}$ is AND'ed into the UPCHK/DNCHK logic.

Figure 8:
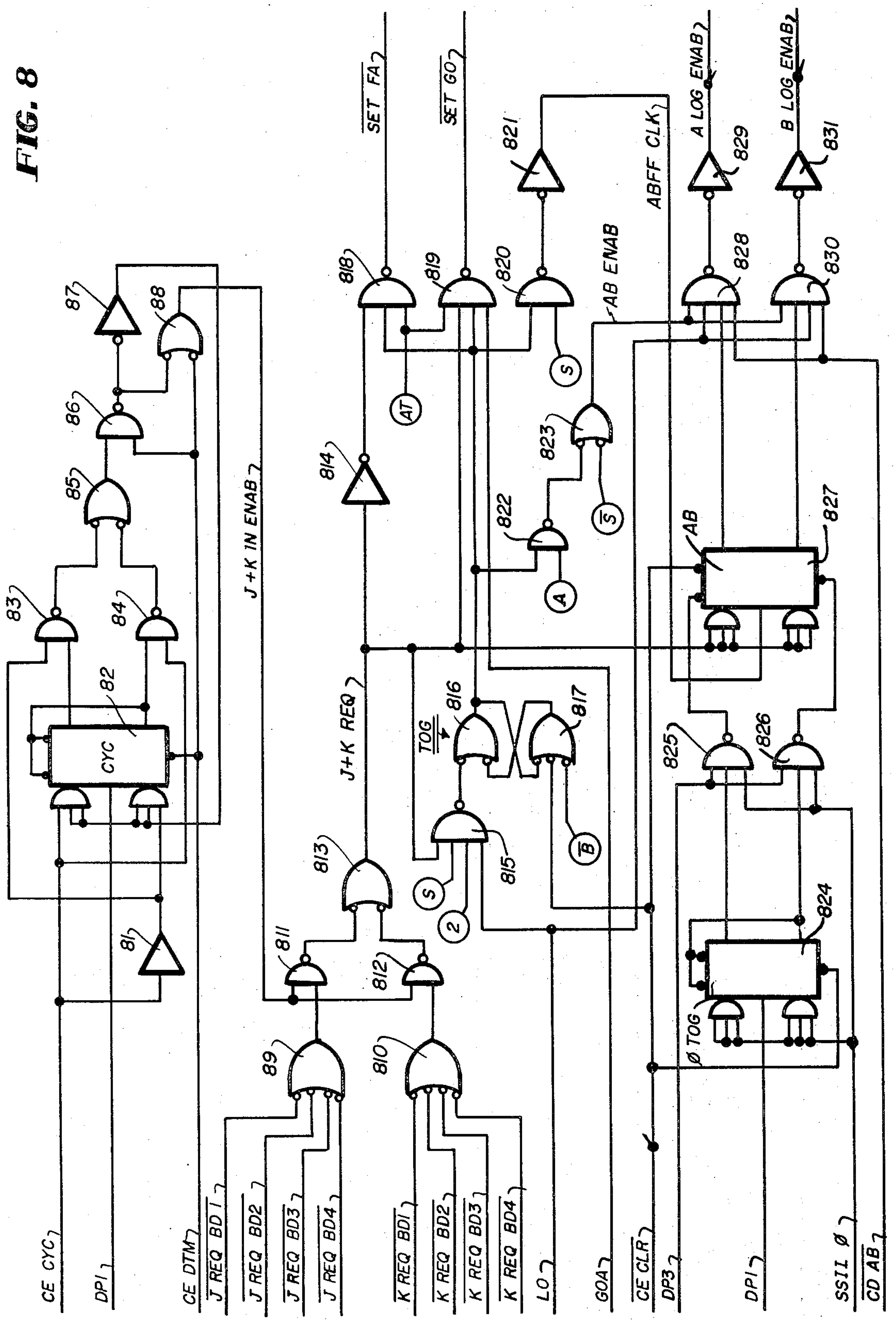
FIGS. 8, 9 10A and 10B are block diagram schematics generally illusitrating the normal operation of the sequential control circuit.
Figure 9:
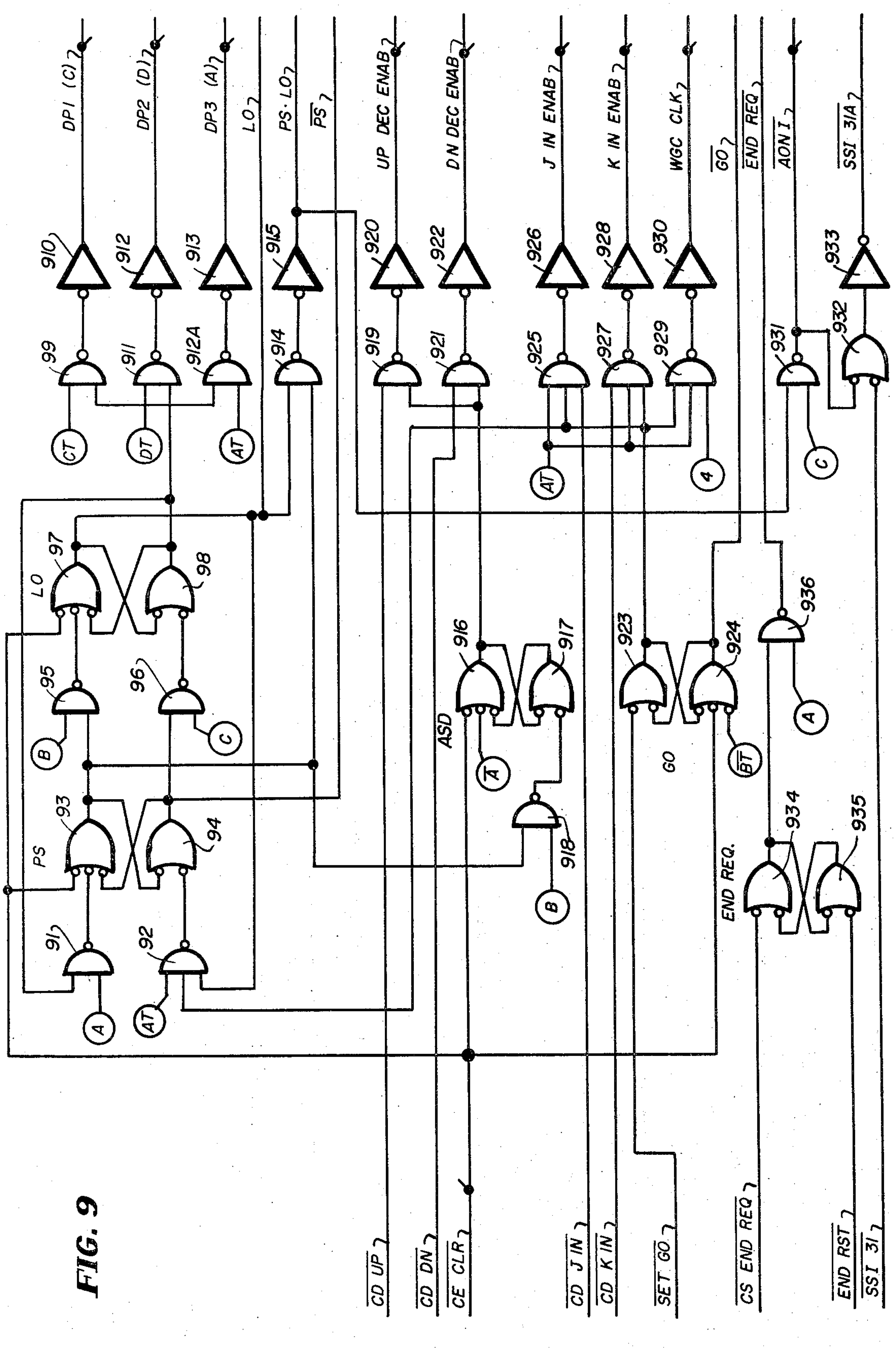

SEQUENCE STATE COUNTER CONTROL 17 (FIGS. 8, 9 and 10)

The sequence state counter control 17 is illustrated in FIGS. 8, 9 and 10. The regular and malfunction interrupt circuit 20 also is illustrated in FIG. 10. With particular reference to these figures, and FIGS. 1–7, the operation of the sequencer during a typical sequence state advance can be described.

At any given time, the sequencer is either in the active or passive cycle. In the passive cycle, the latches PS and LO (gates 93/94, and 97/98) are both set, and the sequencer is waiting for a J+K request to advance. If there is a request, the sequencer jumps into the active cycle. Otherwise, a synchronous alarm check is performed of the four counter alarms.

At the beginning of the passive cycle (clock A), the sequence state decode is enabled via the ASD latch (gates 916/917), casuing both the UP DEC ENAB and the DN DEC ENAB (gates 919–922) to go high. At the same time, AB ENAB (FIG. 8) goes high due to clock S (gate 823) and gates the output of the AB flip-flop 827 to either the A or B LOG ENAB bus, through either the gates 828/829 or the gates 830/831, which feeds the A/B compare logic 22 (FIG. 3). Assume that the proper combination of external signals, AND'ed with the test mode and sequence state, is *not* present at this time. The sequencer will remain in the passive cycle due to no J+K request. Whichever of the A or B LOG ENAB leads was high will go to zero at the end of clock S. The synchronous alarm check is now made. None of the alarms (ZON, GTO, AON, BIN) should be high; if they are indeed low then at the beginning of CLK A [TRAIL] latch GOA (FIG. 10, gates 1020/1021) will set via gate 1016. If the GOA latch is *not* set, due to one of the alarms being high, then 2 microseconds later (CLK 4·8) the INT latch (gates 1040/1041) and then the MALF latch (gates 1032/1033) will set.

Assuming, however, that the GOA latch is set, at the beginning of CLK B it will be reset via CLK F (gate 1021). It will be checked for being reset 2 microseconds later (CLK 4·8) by gate 1027. If the GOA latch is stuck at 1, the MALF latch will be set as above.

Also at the beginning of CLK B, the ASD latch (FIG. 9, gates 916/917) will be reset via gate 918, causing both of the UP DEC ENAB and DN DEC ENAB buses to go low. Referring to FIG. 6, this will cause all of the SSI outputs to go low which will result in a 0 on the $\overline{\text{ZON ALM}}$ lead. In addition a binary alarm will result as follows: with all the decodes low, all $\overline{\text{SS BT}}$ leads will be high. Also $\overline{\text{SSI 0}}$ will be high (no decodes), thus BIN ALM will go high via gates 103 and 106. The combination of ZON·GTO' AON'·BIN will be checked at CLK B [TRAIL], which if true, will set the GOA latch via gate 1017.

Because of the resetting of the ASD latch at the beginning of CLK B, the binary sequence state data to the CPU (SS BT leads) is clocked only during CLK A (ASD true).

At the beginning of CLK C, the GOA latch will be reset again via CLK F at gate 1021. The $\overline{\text{AONI}}$ bus will be made low via gate 931. Referring to FIG. 6, this will cause all the SSI outputs to go high simultaneously. This in turn will cause 1 along the entire $\overline{\text{ZON CARRY}}$ chain (starting with gate 623). This, AND'ed with all of the SSI outputs, will enable all of the GTO AND gates (625, 627, 629, 631) and in turn place a 1 on the outputs of all the AON inverters (626, 628, 630, 632). The combined effect is to cause the GTO ALM and AOM CHK leads (FIG. 10) to go high, via gates 109 and 1011. BIN and ZON are both low again, so the combination ZON'·GTO·AON·BIN' enables gate 1018 during CLK C [TRAIL] which again sets the GOA latch. At the beginning of CLK D the GOA latch is reset again by CLK F at gate 1021, and the $\overline{\text{AONI}}$ lead is restored to 1. The ZON and BIN leads go high again, and so during CLK D [TRAIL], the combination ZON·GTO'·AON'·BIN will be checked again setting the GOA latch via gate 1019. At the beginning of CLK A, the GOA latch is reset again by CLK F and the ASD latch is set again by CLK A, which is back at the beginning of the passive cycle.

This time assume there is a request for advance. As before, either the A LOG ENAB or the B LOG ENAB bus (FIG. 8) will be high. Referring to FIG. 3, this will enable one or the other side of all the A/B compare logic 22 (that is, gates 31/36/312 or gates 32/39/314, for example). If the proper A/B compare output has been enabled, say UPCHK/DNCHK, and the sequencer is in SS31 and any MTM, then gate 45 will be enabled causing KIN 15 to go high. This, in turn, will propogate through gate 53, gates 56, 59, 512, 513 and finally gates 810, 812 and 813 to put a 1 on the J+K REQ lead. One microsecond later (CLK S·2), the TOG latch (gates 816/817) will set via gate 815.

The sequencer is now in the active cycle. Setting of the TOG latch will maintain the AB ENAB lead at 1 throughout CLK A via gate 822. Also the ABFF CLK lead will go high (gates 820–821) and fall at the end of CLK S, toggling the AB flip-flop 827. This will select the opposite half of the A/B compare logic 22. Two microseconds later, at CLK A [TRAIL], the J+K REQ lead will be checked that it is again high (A/B logic compare). If it does, and also no synchronous alarms are present (checked by setting of the GOA latch via gate 1016), a 0 will be placed on the $\overline{\text{SET GO}}$ lead via gate 819. If on the other hand the request is no longer present, a 0 will be placed instead on the $\overline{\text{SET FA}}$ lead via gate 818. Referring to FIG. 10, this will set the FA (False Advance) latch (gates 1025/1026), which will immediately cause a MALF interrupt via gates 1024, 1029, 1030.

Assuming the logic did compare, and there are no synchronous alarms, the GO latch (gates 923/924) will be set at the beginning of CLK A [TRAIL] via gate 819 and SET GO. This will allow the PS latch to reset via gate 92 (which prepares for the reset of the LO latch). The J IN ENAB and the K IN ENAB buses are also enabled via the gates 925–928. Two microseconds later, the WGC CLK lead is enabled via the gates 929 and 930 during CLK 4 and it falls another 2 microseconds later, at the end of CLK A, causing the sequence state counter 18 to change state dependent on its J or K inputs. The TOG latch (FIG. 8) is reset at the beginning of CLK B, however, note that the ASD latch (FIG. 9) is *not* reset, due to the PS latch output being low. Thus the decode is available throughout the next four clock periods (B, C, D, A).

After a change in state of the sequence state counter 18, up to 1.4 microseconds must be allowed for the ZON ALM output to settle, due to a shifting of decodes and a corresponding level shift along the ZON CARRY chain. Thus at the beginning of CLK B the GOA latch (FIG. 10) is reset (as usual via CLK F), and 4 microseconds later, at CLK B [TRAIL], a check is made for no synchronous alarms via gates 1014 and 1015. The GO latch (FIG. 9) is reset at the beginning of CLK B [TRAIL] via the gate 924.

At the beginning of CLK C latch LO (FIG. 9) is reset via the gate 96. This "unlocks" the DP (Distributing Pulse) circuit. Three DP's are sent out, via the gates 99–913, one each during CLK D [TRAIL], CLK C [TRAIL] and CLK A [TRAIL], and each is 4 microseconds in duration. These DP's can be combined with the test mode detector to set or reset latches, preset the timer 15, cause a "regular" interrupt to the CPU, etc., as can be seen in FIG. 7. Three DO's are provided for more flexibility, where more than one pulse might be required in sequence to enable a particular circuit.

During CLK's C, D and A, the sequencer is checked for the absence of synchronous alarms as before by the setting and resetting of the GOA latch (FIG. 10), either via gates 1014–1015 (CLK's C, D) or via gate 1016 (CLK A). At the beginning of CLK A, the PS latch (FIG. 9) is set once again (via gate 91), and 8 microseconds later the LO latch (FIG. 9) is setting, in effect locking out the DP's until another sequence state advance. Thus at the beginning of CLK B, the sequencer is back in the "passive cycle" (PS·LO). However, it must go through CLK's B, C, and D again before a J+K request can be recognized (in CLK A); therefore the hardware routine of the synchronous alarms is repeated as before, starting with the resetting of the ASD latch (FIG. 9) in CLK B. Note that even if sequence state advances occur one immediately followed by another, the hardware routine is still performed. (A J+K request during DP3, CLK A, is inhibited due to the LO latch being low at the time (see gates 815, 828, 830).

In summary, for a sequence state advance, the sequence state counter control 17 is initially in the passive cycle, executing its hardware routine of the decode circuitry. At the beginning of some CLK A, A J+K request is recognized. The TOG latch (FIG. 8) sets, and the A/B flip-flop 827 toggles. If both sides of the A/B logic compare, the GO latch (FIG. 9) is set, and the sequence state counter 18 is clocked at the end of CLK A. The new decode is checked (CLK B [TRAIL]), and the three DP's are sent out during CLK C, D and A [TRAIL]. The sequence control then returns to its passive cycle.

One slight variation occurs whenever the sequence state counter 18 jumps to sequence state 0 (normally the end of a test). During DP1 the 0TOG flip-flop 824 is toggled, and in DP3 the new status of the 0TOG flip-flop 824 is jammed into the AB flip-flop 827, via the gates 825–826. This has the effect of starting each new test out with the opposite set of logic, and thus each sequence state will also begin with the opposite set of logic it did in the previous test. This is used as follows. Referring to FIG. 3, assume that the first input of gate 32 is open (A OPR input). If, during the test, B OPR is always high before A OPR goes to 1, then if the A/B compare logic 22 always started out with A LOG ENAB high first, the fault would go undetected (or until A OPR was incorrect), since when the logic toggled gate 32 would look good (open input would look like a 1). However, for some sequence state, the B LOG ENAB was first, the toggle would occur as soon as B OPR was high; gate 31 would not be enabled yet (A OPR still low) and the FA latch would set.

MAINTENANCE CONSIDERATIONS

Reference to various diagnostic routines has already been made in discussing the operation of the sequencer. This section will explain the basic diagnostic schemes used.

Three circuits have their own independent diagnostic routines which will only be treated lightly. The clock circuit 14 has a CLK ALM circuit which monitors the outputs of the various counters in the clock card. The test mode decode circuit 16 provides a 1/N type check on its outputs (DEC ALM). These two signals are OR'ed together with FA ALM from the FA latch (gates 1025/1026), at the gate 1024, any of which can cause a MALF INT. The third circuit, the timer 15, is routined by presetting it via the combining logic 25 and freezing the clock such that the timer flip-flops can be examined by the CPU. A second test is made by presetting it to its maximum value and letting it count backwards to zero while it is being timed by the CPU.

The combining logic 25 and output latch inputs 26 are routined by advancing through each sequence state (using the TEST ADV mode of the counter) and observing the status of the output latches from the CPU, as illustrated in FIG. 1. Whether or not the latches themselves are stuck at one or zero is, however, for the most part hardware detectable. If a latch sticks at one (or the associated MGS is stuck at one) the relay will pick up (or diode conduct, if there is no relay), causing RLY CHK to go high. This will fail either the start or end sequence (UPCHK/DNCHK). If the latch sticks at 0, (or the associated MGS is stuck at 0, then in whatever sequence state that output is required the test will fail, most likely due to the sequencer not advancing (due to a signal not coming back from the test unit).

It will be first assumed that the circuit under test is bad. However, if a test consistently fails in the same sequence state, then the sequencer and associated interface is suspected.

Also mentioned previously, the MBT's and input interface 21 can be checked by themselves via the CE TEST MBTS lead, which, when enabled by the CPU, forces all MBT's to ground which can be verified by observing all X RLY OPR leads low by the CPU. Further localization can be achieved by isolating the MBT-TBB's via the CE MBT SIM lead.

This leaves the A/ B compare logic 22, advance logic 23, sequence state counter 18, WGC to decimal decode 24, and sequence state counter control 17.

Failures in the decode circuit 24 are hardware detectable and have already been discussed at length. The sequence state counter 18 must however be checked, and this is done via the DTM (Diagnostic Test Mode) control.

During a DTM the lead CE DTM (FIG. 8) is enabled, which puts the J+K REQ logic under control of the DTM CYC flip-flop 82. The lead CE TEST ADV (FIG. 5) is made high and the lead CD REG ADV (FIG. 5) is made low, thus gating the SSII outputs of the sequence state counter 18 back around to its inputs, as illustrated in FIGS. 1 and 4–6. By toggling lead CE CYC (FIG. 8), one sequence state advance will take place. Therefore, the CPU can observe that the sequence state counter 18 can advance through all sequence states by toggling the lead CE CYC 32 times, and observing the binary sequence state decode for each count. Every time the lead CE CYC is toggled, a mismatch occurs between the CYC flip-flop 82 output and inputs via gate 85. This enables J+K IN ENAB long enough for one sequence state advance, however, it goes away when DP1 toggles the CYC flip-flop, making the inputs and outputs match again. Note J+K IN ENAB is always high for regular tests, due to the lead CE DTM being low.

With the sequence state counter 18 verified (which also checks the operation of the sequence state counter control 17), it is then used to check the A/B compare logic 22 and the advance logic 23, working backwards from the inputs to the sequence state counter. It was for this reason that the advance logic 23 was structured as shown in FIG. 4. The plan of using only 4-input AND's (or any-number-input AND's, as long as they are the same), followed by only OR's (possibly many levels) allows a much simpler rountining scheme than the general ad hoc approach to advance logic (complex multiple-level AND-OR combinations, with no limitation on uniformity of gate sizes). The latter scheme is practically impossible to check due to a lack of convenient access from an external source (that is, CPU).

Referring to FIG. 4, it will be seen that it is necessary to routnine, via the CPU, only the inputs of the AND gates, since faults at the inputs of the OR gates (and inverters will be otherwise detectable: a stuck-at-one fault at the input of a negated-input OR gate (that is, gate 46) will result in a test not advancing sequence states when it should (detected by the CPU timing out waiting for an interrupt), since the J+K request will not be seen. Similar to a latch output stuck at 0, this fault will be recognized by consistent failures in the same sequence state. A stuck-at-0 at the input of a negated input OR gate will show up as a constant request for advance, which in most cases will show up immediately as an illegal decode (GTO). In other cases this will happen sometime during a test being run (still detectable by GTO alarm).

A stuck 0 on the inputs of one of the AND gates is detectable in the same way a stuck 1 is on the inputs of the negated-input OR's — failure to advance sequence states, causing CPU time-out. A stuck 1, however, is more difficult, if not impossible to detect without periodic routining, since 1 are normally expected at the inputs to advance sequence states. Therefore, the inputs are checked by enabling all but one at a time and checking for a sequence state advance. In this configuration, the sequence state counter 18 can be thought of as a parallel-in diagnostic register. The routine is carried out in two steps: first only the J-inputs are enabled by grounding CD KIN into gate 927. The SSII outputs are checked by disabling all decodes (0 on both CD UP and CD DN, gates 919 and 921). To avoid a MALF interrupt due to GOA not setting during a CLK A [TRAIL], CS GOA is made high, via the gate 1013 which forces the GOA latch to set during CLK X [TRAIL] irregardless of the state of the synchronous alarms. All MTM's, STM's and GO bits are enabled via a special MTM in the test mode decode. All LEQ lines (A/B compare outputs) are brought up by making the lead CE ORL (FIG. 3) low. If any SSII input to one of the AND gates is stuck at 1, an erroneous request for advance will occur. If it is on the J-side, one or more of the flip-flops will set to 1 (most likely causing a GTO alarm). This is repeated for the other inputs: to check for either MTM or STM/GO inputs stuck at one, the one to be checked is disabled and the other bus is forced high by the test mode decode circuit. All SSII outputs are enabled by making the lead CE AON II (FIG. 6) low. The LEQ's are forced high again via the lead CE ORL. To check for stuck 1 on the LEQ inputs, the others are forced high as above (SSII, MTM, STM/GO). All LEQ's are disabled by the CPU making the lead CD AB (FIG. 8) low, disabling both A and B LOG ENAB. After all the above has been done, the counter is forced to all ones by a 0 on the CE ALL ONES lead (FIG. 5). The 0 is removed and then the J inputs disabled (only K inputs enabled) via a ground on the CD J IN lead (gate 925). This sets up the counter for the second sequence of four steps identical to that described before, except now faults on the K side are being sought (one or more of the flip-flops will reset to 0).

As has been described before, the signal inputs to the A/B compare logic 22 is essentially self-checking via the FA alarm (thus not requiring routining of each gate individually, which would otherwise be required since the CPU has no control over them in groups like it does for the inputs to the advance logic 23). Also, routining of the negated input OR gates has already been done — a stuck 0 will show up as a stuck LEQ input during the advance logic routine; a stuck one will result in a FA alarm during a regular test (logic will switch and no J+K request will be present). This leaves only the A and B LOG ENAB buses. A stuck-at-zero condition on either of the inputs of an AND gate will result in a FA alarm again. A stuck 1 will go undetected, however, and must be explicitly checked for. This may be done by enabling all the SSII outputs, MTM's STM/GO leads the same as if checking for stuck 1 on the LEQ inputs of the advance logic, except that in addition to putting a 0 on the CD AB lead, a 0 is also placed on the CE IN OR lead (FIGS. 2 and 3), simulating all input condition combinations true. Any stuck at 1 A or B LOG ENAB input will cause an erroneous advance as before. (This check could actually be done simultaneously with the advance logic routine).

This completes all of the diagnostic routines required. One additional feature of the hardware needs to be mentioned. During the running of the various advance routines, the sequence state counter 18 is being used as a diagnostic register to catch faults, which appear as an incorrect 1 in a field of 0, or vice versa. It is extremely likely that such a fault will cause a GTO decode error. Under these circumstances a single fault in the input will always cause three decodes (decimal) to be high simultaneously. The resulting encode (binary — decimal) will therefore be the OR'ing of the three and therefore meaningless. For this reason the decimal decodes were divided in two halves — up and down, as can be seen in FIG. 6. In a 32 state counter, decodes 1–16 will be on the upside, and decodes 17–0 will be on the down side. The three decodes resulting from a fault will always result in two being one half of the decode, and one being on the other. By disabling either one half or the other, via a 0 on either the $\overline{\text{CD UP}}$ or $\overline{\text{CD DN}}$ leads (FIG. 9), the GTO ALM can be made to go away (the side with two decodes is disabled, leaving the other side with one decode). This remaining decode will be correctly converted to binary, thus meaningful to the CPU in formulating a trouble number as follows: as an example, assume that a fault exists such that the LEQ A input to gate 41 is stuck at 1. This will be caught during the advance routine as an erroneous request to advance on the JIN 2 lead, causing the counter to change to (WCG) 000.... 0100 (flip-flop 2 set). This will immediately cause a GTO alarm, due to the three decodes coming up: 0, 3 and 18. The resulting binary encode will be 19 (OR'ing of the above). By disabling the up side of the decode (decode 3), the GTO ALM still remains. However, by disabling the down side (decodes 0 and 18), only decode 3 remains and the GTO ALM goes away. This isolates the fault to only those gates connected to the particular OR gate connected to J IN 2 (*third* from the end). Further localization, in fact down to the gate, can be realized by running the advance routine separately for each MTM (rather than all MTM's at the same time). For faults on the K side, K IN 0 is associated with a decode of 17, etc. A slight variation occurs for gates tied to multiple OR inputs (that is, gate 42). In such cases the flip-flop singled out will be the highest one set in the group, (that is, for the group enabled by gate 42, the three decodes will be 0, 14, and 18. Decode 14, the only one on the up-side, is associated with flip-flop 13, or the gate connected to J IN 13). However, in any case, these decodes can be used to create unique trouble numbers in the event of a fault.

It will thus be seen that the objects set forth above among those made apparent from the preceding description, are efficiently attained and certain changes may be made in carrying out the above method and in the construction set forth. Accordingly, it is intended that all matter contained in the above description or shown in the accompanying drawings shall be interpreted as illustrative and not in a limiting sense.

Now that the invention has been described, what is claimed as new and desired to be secured by Letters Patent is:

1. In combination, a sequence state counter for providing a plurality of output sequence states in consecutive fashion, means for providing a decode of each of said plurality of output sequence states, at least one and only one of said decodes normally being high, an error detection arrangement for detecting errors in the decode of said output sequence states, said arrangement comprising means for detecting and providing a first alarm whenever the decodes of all of said output sequence states are low, means for detecting and providing a second alarm whenever more than one of the decodes of said output sequence states are high, and means for detecting and providing a third alarm whenever the decodes of all of said output sequence states are high simultaneously whereby an alarm is provided whenever less than or more than one decode is high to thereby indicate an erroneous decode of the output sequence state of said sequence state counter.

2. The combination of claim 1, wherein said error detection arrangement comprising a serial 1/N circuit, said first alarm being derived from a serial chain that starts with the decode of the highest output sequence state and is carried through all of the decodes to the decode of the lowest sequence state, whereby any decode going high causes that portion of the serial chain above that decode to the output to go high, said first alarm being provided whenever the decode of all of said output sequence states are low.

3. The combination of claim 2, wherein said serial 1/N circuit comprises a plurality of gates, one input to each of said gates being from an associated decode and another input thereof being said first alarm signal.

4. The combination of claim 2, wherein said sequence state counter has a passive state and an active state, said combination further including means operable during each passive state of said sequence state counter to simulate the decode of all of said output sequence state being low, whereby said means for detecting and providing said first alarm is continually checked during each passive cycle of said sequence state counter.

5. The combination of claim 4, wherein said combination further includes means operable during each passive state of said sequence state counter to simulate the decode of all of said output sequence states being high simultaneously, whereby said means for detecting and providing said third alarm is continually checked during each passive cycle of said sequence state counter.

6. The combination of claim 3, wherein said error detection arrangement further comprises a gate across the inputs of each of said plurality of gates forming said serial 1/N circuit, the outputs thereof comprising said second alarm, whereby if more than one decodes goes high at the same time, the output of one or more of said gates goes low, causing said second alarm.

7. The combination of claim 6, wherein all of said second alarms outputs of said gates are OR'ed together to provide said second alarm.

8. The combination of claim 6, wherein each of said gates across the inputs of each of said plurality of gates forming said serial 1/N circuit comprises an AND gate.

9. The combination of claim 6, wherein said error detection arrangement further includes means for inverting the outputs of each of said gates across the inputs of each of said plurality of gates forming said serial 1/N circuit, said inverted outputs being AND'ed together to form said third alarm, whereby said third alarm is provided when all of said decodes are high simultaneously.

10. The combination of claim 4, wherein said sequence state counter when in said active state checks for the absence of said first second and third alarms before advancing its output sequence state.

11. The combination of claim 1, wherein said sequence state counter is based on the walking gray code which yields $2n$ legal states from $n$ flip-flops and $2^n-2n$ illegal states, only one bit of the output walking gray code thereof changing between any two consecutive states, encoding means comprising a plurality of gates for encoding the output walking gray code into a decimal code, said decimal decode being divided in two halves forming an up-half and a down-half in a manner such that a single fault in the input to said encoding means will always cause three decodes to be simultaneously high, said three decodes being simultaneously high operating said means for detecting and providing said second alarm, whereby an indication of said erroneous decode is provided.

12. The combination of claim 11, wherein said encoding means in the event of a fault in the input thereto will always cause three decodes to be simultaneously high, said three decodes resulting in two of said decodes being on one of said up-half and down-half and one of said decodes being on the other one of said up-half and down-half.

13. The combination of claim 12, further including means for disabling either said up-half decode or said down-half decode, said second alarm being removed when said one up-half or down-half having said two decodes is disabled, whereby the fault can be isolated to only those gates of said encoding means providing said one decode.

14. The combination of claim 1, further including advance logic comprising a plurality of input AND gates and a plurality of output OR gates, the outputs of said AND gates being OR'ed through established ones of said OR gates to provide an appropriate output to said sequence state counter to advance its output sequence state, said AND gates each having an equal number of inputs and said inputs being accessible via buses, and means for making all but one of said inputs of each of said AND gates high, whereby a stuck 1 on any of said inputs to any one of said AND gates can be detected and located by said stuck 1 causing an erroneous request for said sequence state counter to advance its sequence state.

15. The combination of claim 14, wherein the arrangement of said advance logic is such tht a stuck 0 fault at the input of one of said OR gates will result in a test of said OR gate not providing an output to said sequence state counter to advance its sequence state, and a stuck 1 at the input of one of said OR gates will cause a constant request for said sequence state counter to advance its sequence state.

16. The combination of claim 15, wherein said struck 1 at the input of one of said OR gates normally is detected by said means for detecting and providing said second alarm.

17. The combination of claim 15, wherein a stuck 0 on the input of one of said AND gates will result in a test of said AND gate not requesting said sequence state counter to advance its sequence state.

18. The combination of claim 1, wherein the conditions for a particular sequence state advance of said sequence state counter depend on a combination of various predetermined signals and instructions, further comprising A/B compare logic including a plurality of AND gates for AND'ing together said various predetermined signals to provide output logic equations necessary for various sequence state advances, and advance logic including a plurality of AND gates for AND'ing together various ones of said logic equations and said instructions to provide an appropriate output to said sequence state counter to advance its sequence state.

19. The combination of claim 18, wherein the arrangement of said A/B compare logic and said advance logic permits the same combination of various predetermined signals to be AND'ed together and used by said advance logic with different ones of said instructions.

20. The combination of claim 18, wherein said A/B compare logic is formed by duplicating said AND gates and OR'ing the outputs thereof back together, one or the other of said AND gates being selected in sequence and the output thereof being checked to be the same as the output of the other one of said AND gates.

21. The combination of claim 20, further including means alternately operated to enable one or the other of said AND gates, whereby each sequence state advance is initiated with an opposite set of logic.

22. In combination, a sequence state counter for providing a plurality of output sequence states in consecutive fashion, said sequence state counter being based on the walking gray code which yields $2n$ legal states from $n$ flip-flops and $2^n2n$ illegal states, only one bit of the output walking gray code thereof being changed between any two consecutive states, encoding means comprising a plurality of gates for encoding the output walking gray code into a decimal code, said decimal code being divided in two halves forming an up-half and a down-half in a manner such that a single fault in the input to said encoding means will always cause three decodes to be simultaneously high, and means for detecting and providing an alarm when three decodes are simultaneously high, whereby an indication of an erroneous decode is provided.

23. The combination of claim 22, wherein said encoding means in the event of a fault in the input thereto will always cause three decodes to be simultaneously high, said three decodes resulting in two of said decodes being on one of said up-half and down-half and one of said decodes being on the other one of said up-half and down-half.

24. The combination of claim 23, further including means for disabling either said up-half decode or said down-half decode, said alarm being removed when said one up-half or down-half having said two decodes is disabled, whereby the fault can be isolated to only those gates of said encoding means providing said one decode.

25. The combination of claim 22, wherein said sequence state counter comprises a plurality of input AND gates, and wherein said encoding means comprises a plurality of gates for encoding the output walking gray code of said sequence state counter into decimal code and for providing two duplicate outputs of the decode, said encoding means including an error detection arrangement for detecting errors in the decode of said output sequence states of said sequence state counter, one of said two duplicate outputs of the decode being coupled to said error detection arrangement, advance logic comprising a plurality of input AND gates and a plurality of output OR gates, the outputs of said AND gates being OR'ed through established ones of said OR gates to provide an appropriate regular advance output to said input and gates of said sequence state counter to advance its output sequence state, said AND gates each having an equal number of inputs and said inputs being accessible via buses, the other one of said two duplicate outputs of the decode forming a test advance output and being coupled as inputs to both said advance logic and said sequence state counter, and means for enabling said input AND gates of said sequence state counter to accept said test advance output to advance its output sequence state and to block said regular advance output from said advance logic, whereby said sequence state counter can be routined to check its operation.

* * * * *